(12) United States Patent
Li et al.

(10) Patent No.: US 12,117,999 B2
(45) Date of Patent: Oct. 15, 2024

(54) MASKING SHARD OPERATIONS IN DISTRIBUTED DATABASE SYSTEMS

(71) Applicant: International Business Machines Corporation, Armonk, NY (US)

(72) Inventors: Shuo Li, Beijing (CN); Xiaobo Wang, Beijing (CN); Sheng Yan Sun, BeiJing (CN); Leilei Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/488,450

(22) Filed: Sep. 29, 2021

(65) Prior Publication Data

US 2023/0099501 A1 Mar. 30, 2023

(51) Int. Cl.
*G06F 16/2453* (2019.01)
*G06F 16/22* (2019.01)
*G06F 16/23* (2019.01)

(52) U.S. Cl.
CPC .... *G06F 16/24534* (2019.01); *G06F 16/2282* (2019.01); *G06F 16/2358* (2019.01)

(58) Field of Classification Search
CPC .............................................. G06F 16/24534
USPC ....................................................... 707/713
See application file for complete search history.

(56) References Cited

U.S. PATENT DOCUMENTS

| | | | |
|---|---|---|---|
| 6,912,539 B1* | 6/2005 | Kapitanski | G06F 16/258 707/684 |
| 10,268,710 B2 | 4/2019 | Hu et al. | |
| 10,339,116 B2 | 7/2019 | Hu et al. | |
| 11,604,789 B1* | 3/2023 | Cannon | G06F 40/30 |
| 2004/0181522 A1* | 9/2004 | Jardin | G06F 16/27 |
| 2010/0185645 A1* | 7/2010 | Pazdziora | G06F 16/242 707/E17.07 |
| 2013/0124500 A1* | 5/2013 | Beavin | G06F 16/24534 707/E17.017 |
| 2014/0006383 A1* | 1/2014 | Hacigumus et al. | G06F 16/24539 707/718 |
| 2014/0188924 A1* | 7/2014 | Ma | G06F 16/24542 707/765 |
| 2015/0220584 A1 | 8/2015 | Isaacson et al. | |
| 2015/0331898 A1* | 11/2015 | Ou | G06F 16/283 707/703 |
| 2016/0357751 A1* | 12/2016 | Li | G06F 16/24578 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Muluemebet Gurmu
(74) *Attorney, Agent, or Firm* — Daniel M. Yeates (57) ABSTRACT

A computer-implemented method masks shard operations in a distributed database. The method includes performing a shard operation on a first table with a first column and a second column, where the shard operation divides the first table into a first shard with the first column and a second shard with the second column. The method also includes receiving a query, where the query is configured to perform at least a first command. The method further includes determining the first command is directed to the first column. The method includes updating the query to access the first shard in place of the first table. The method also includes executing the query and returning a set of results for the query to a source of the query.

20 Claims, 8 Drawing Sheets

(56) References Cited

U.S. PATENT DOCUMENTS

2017/0103116 A1* 4/2017 Hu ................... G06F 16/278
2017/0371910 A1* 12/2017 Joo .................. G06F 16/2329
2020/0242157 A1* 7/2020 Liu ..................... G06F 16/86
2020/0341955 A1 10/2020 Sukumaran et al.
2020/0409566 A1* 12/2020 Demoor ............... G06F 16/27
2021/0073208 A1* 3/2021 Wong ............... G06F 16/2471

* cited by examiner

MASKING SHARD OPERATIONS IN DISTRIBUTED DATABASE SYSTEMS

BACKGROUND

The present disclosure relates to database operations, and, more specifically, to masking shard operations in a distributed database.

Modern database systems can contain relatively large amounts of data. This data can be processed, updated, retrieved, and/or otherwise used for many purposes. Queries can be used to process the data. Queries are generally written to conform to the structure of a database. A single query can retrieve data from multiple data sources, which can result in a variety of potential flow paths to execute the query.

SUMMARY

Disclosed is a computer-implemented method to mask shard operations in a distributed database. The method includes performing a shard operation on a first table with a first column and a second column, where the shard operation divides the first table into a first shard with the first column and a second shard with the second column. The method also includes receiving a query, where the query is configured to perform at least a first command. The method further includes determining the first command is directed to the first column. The method includes updating the query to access the first shard in place of the first table. The method also includes executing the query and returning a set of results for the query to a source of the query. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
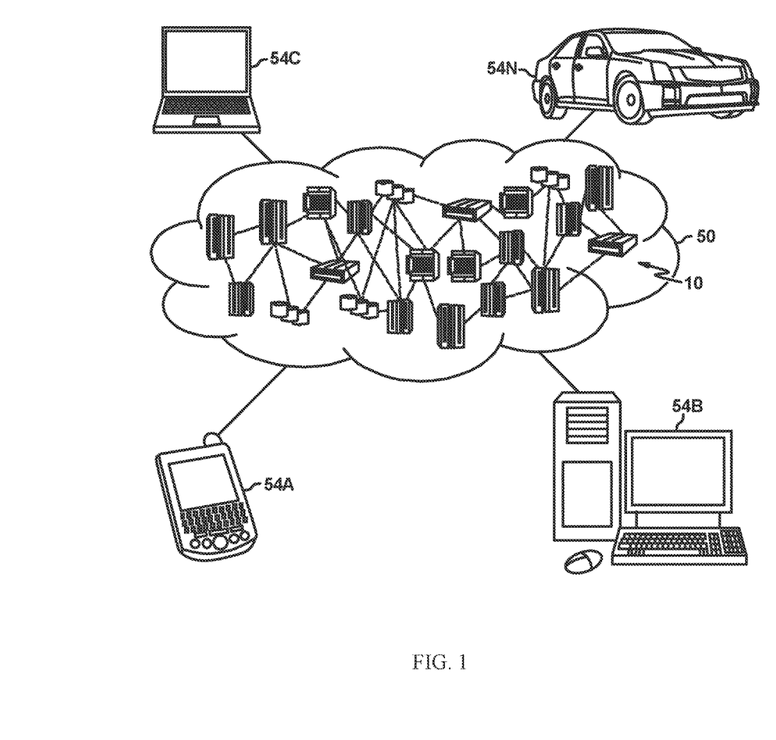
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in Figure1 are intended to be illustrative only and that computing nodes 10 and cloud computing environment 50 can communicate with any type of computerized device over any type of network and/or network addressable connection (e.g., using a web browser).

Figure 2:
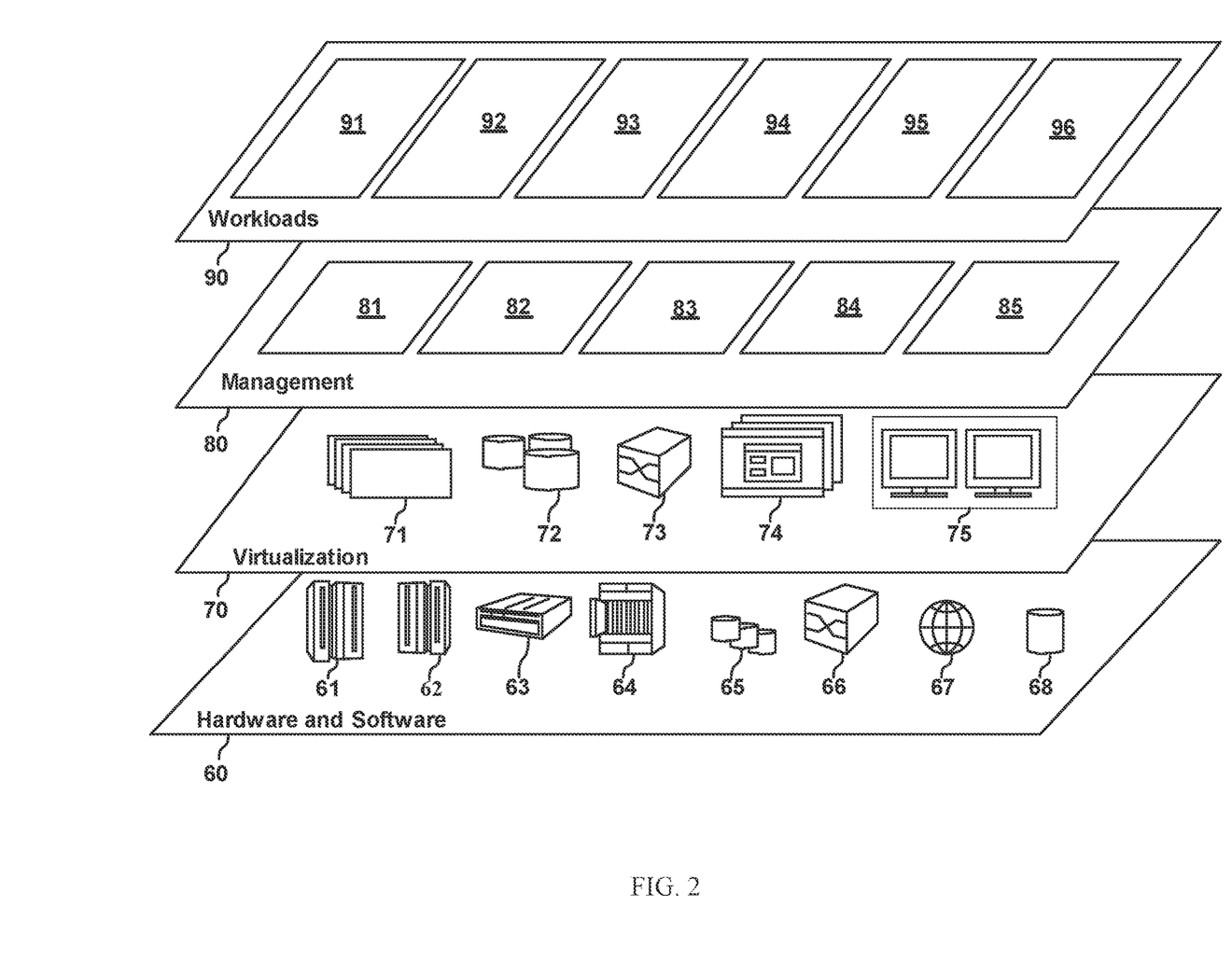
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and masking shard operations in distribute database 96.

Data Processing System in General

Figure 3:
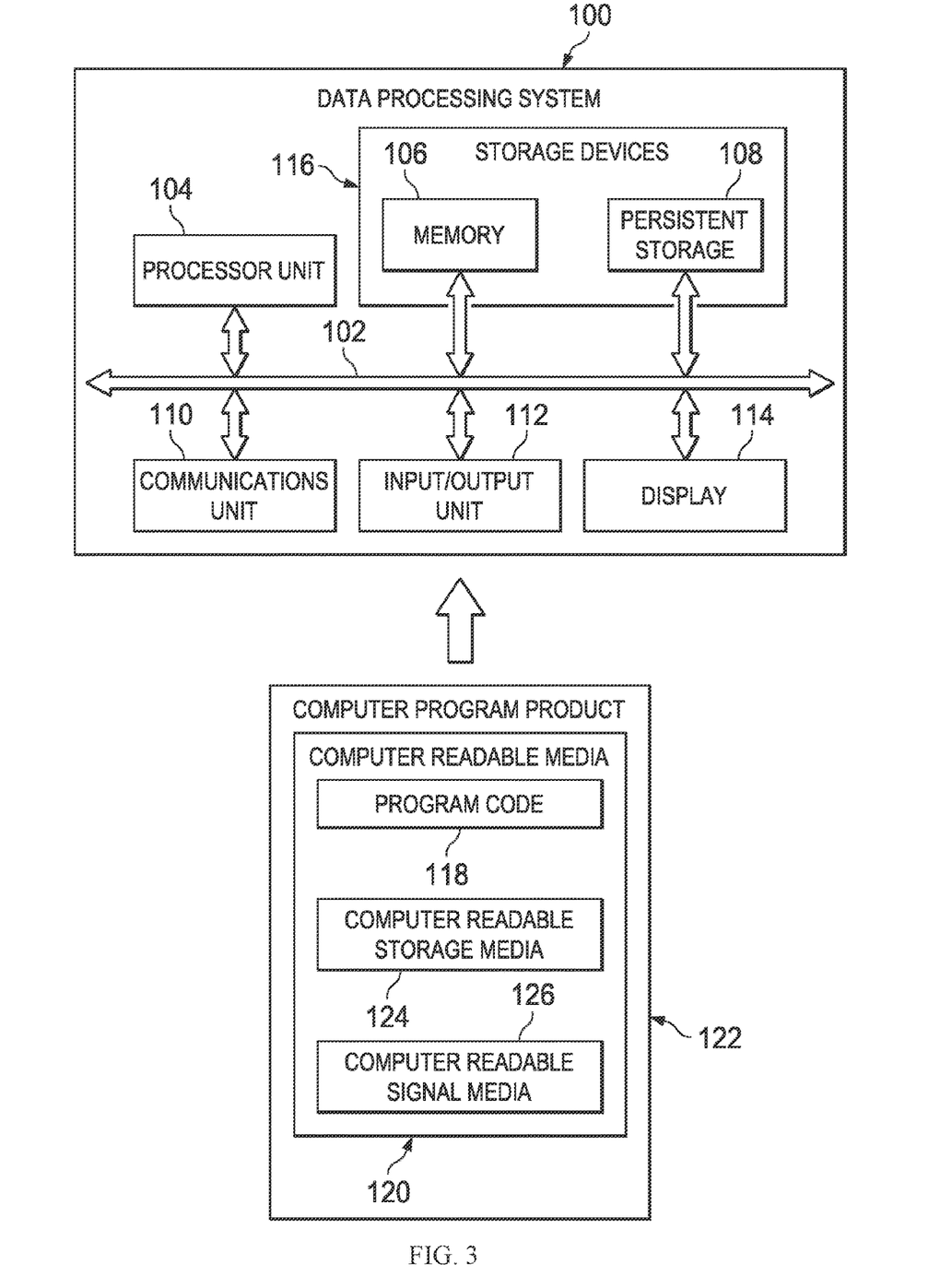
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present disclosure relates to database operation, and, more specifically, to masking shard operation in a distributed database.

Modern database systems can contain relatively large amounts of data. This data can be processed, updated, retrieved, and/or otherwise used for many purposes. Queries can be used to process the data. Queries are generally written in a specific manner to correlate to the structure of a database. For example, the query will include language based on the names and configurations of data structures within the database. A single query can retrieve data from multiple data sources, which can result in a variety of potential flow paths to execute the query.

A database shard operation is the process of separating the columns of a table into two or more unique tables/shards. Shard operations can be performed for a variety of reasons, such as regulatory compliance, table size, efficiency, and storage optimization among others. Because shard operations can lead to table names being redefined and/or links between various tables to change, this can cause a disruption in accessing/adding data to the various shards. For example, if a first table was split into three shards, a query that retrieves/adds data to the first table may have to be updated to ensure proper alignment of data among the shards. If the query is configured to delete a row of data, but only deletes the row in the first shard, this can lead to mismatch of rows in a subsequent query between the first shard and the other shards.

Shard operations can, generally, reduce the efficiency of a database system and/or require substantial rework of queries to match the shard operation. A large amount of effort can be required to set up the shard operation and then update each query to be directed to the newly created shards. This can cause delays to implementing shard operations.

Embodiments of the present disclosure can mask shard operations in a distributed relational database. In some embodiments, the masking can allow for existing queries to continue to access the data as if the table has not undergone a shard operation. This can greatly reduce the cost of performing shard operations and therefore increase the efficiency of the overall database system.

In some embodiments, the masking is accomplished by updating a query. In some embodiments, the manager can automatically update the queries that include the affected table. The updates can alter the query to perform the same operations on the original query in each shard of the previous table. The updated query can return a result set/accomplish the same tasks as if the shard operation did not occur without necessitating any changes to the original query.

In some embodiments, a query is received and parsed by a query manager. The query manager can determine if any portions of the query are directed to a table that was subject to a shard operation. The query manager can determine the affected commands.

In some embodiments, the query manager can update the affected commands. In some embodiments, the commands can include one or more of a select, an update, an insert, and a delete command.

In some embodiments, the query manager can execute the updated query and returns the results/confirmation of completion to the source of the query.

The aforementioned advantages are example advantages, and embodiments exist that can contain all, some, or none of the aforementioned advantages while remaining within the spirit and scope of the present disclosure.

Figure 4:
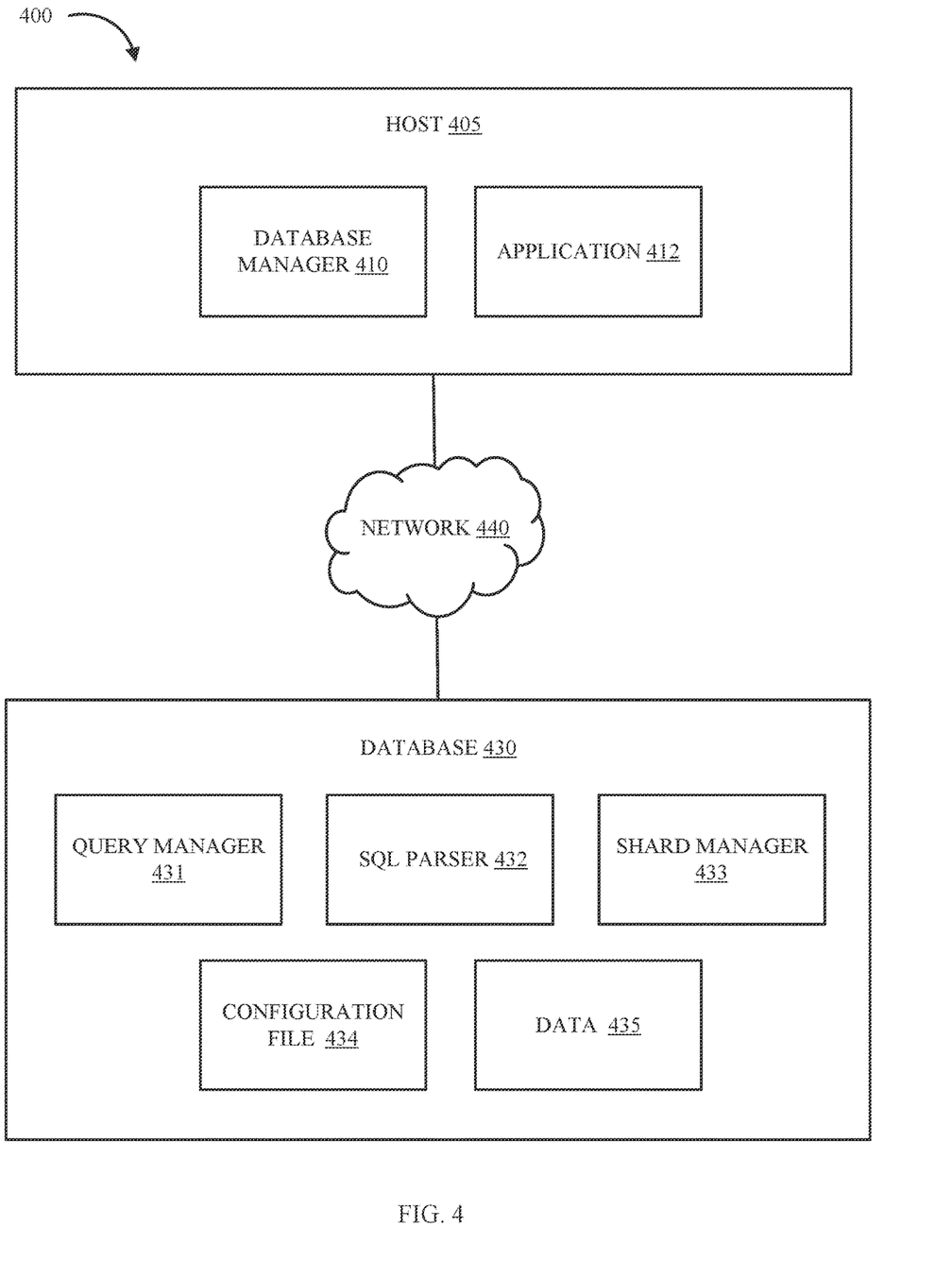
FIG. 4 illustrates a functional diagram of a computing environment suitable for masking shard operations in accordance with some embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, database 430, and/or the other computing devices in computing environment 400, can include a data processing system such as the data processing system 100. In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50 (shown in FIG. 1). In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410 and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, the queries generated by application 412 can be sent as a batch to database manager 410 and/or database 430. In some embodiments, the queries can be sent on an as need basis and/or continuously. In some embodiments, application 412 is included in database manager 410. In some embodiments, application 412 can generate/send two or more different queries. In some embodiments, the query is generated in SQL. In some embodiments, application 412 displays the results of the query. The results may be returned in an SQL format, and/or as images, graphs, trends, and/or other similar formats.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, host 405 includes one or more applications consistent with application 412. Or said differently, application 412 can include any number of unique applications. In some embodiments, computing environment 400 includes one or more additional computing devices that include an application consistent with application 412. In some embodiments, each application can generate the same and/or different queries than application 412.

Database 430 can be any combination of hardware and/or software configured to store data in a database system. In some embodiments, database 430 is part of a federated database system. A federated database system can be any number databases that appear as a single database to the requesting device (e.g., host 405, application 412, etc.). In some embodiments, database 430 includes two or more databases communicatively connected that can act as a single database (e.g., a federated database system). In some embodiments, database 430 may be contained within host 405. In some embodiments, database 430 can include query manager 431, SQL parser 432, shard manager 433, configuration file 434, and data 435.

Query manager 431 can be any combination of hardware and/or software configured to oversee execution of an SQL query. In some embodiments, query manager 431 includes one or more of SQL parser 432, shard manager 433, configuration file 434, and data 435. However, FIG. 4 depicts them as separate components for discussion purposes. In some embodiments, query manager 431 can dynamically update queries after a shard operation in a database. Said differently, query manager 410 can process queries that were designed for the database prior to the shard operation, without updating the query.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 develops an access path for the queries. The access path indicates an order in which to perform the various commands included in a query. In some embodiments, two or more access paths can accomplish the results of the query. SQL parser 432 can optimize the query. The optimizing can include selecting the access path that will result in the lowest cost to fully execute the query.

Shard manager 433 can be a combination of hardware and/or software configured to mask changes in database 430 from shard operations to incoming queries. In some embodiments, shard manager 433 can be included within SQL parser 432. In some embodiments, shard manager 433 determines if/when a query is configured to access a table that was subject to a shard operation. In some embodiments, shard manager 433 can update the access path generated by SQL parser 432 for the query to access the two or more shards of the query. The access path update can be based on the shard operation and/or configuration file 434. In some embodiments, select, update, insert, and delete commands included in a query can be updated to perform the same operation on the shards of a table as if the data was in a single table. FIGS. 6A-6F include examples of a shard operation and updating the various commands and are discussed in more details below.

Figure 6A:
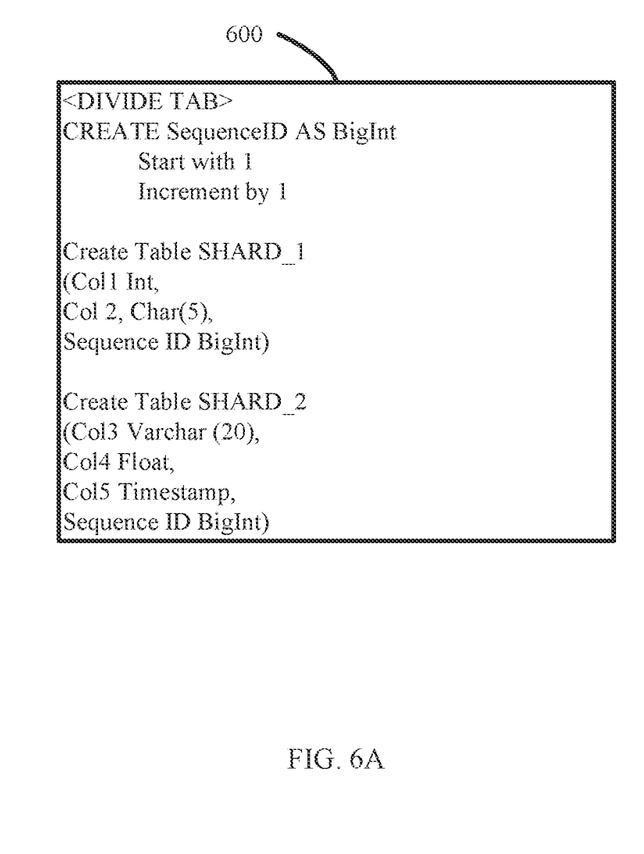
FIG. 6A includes an example shard operation of a table, in accordance with some embodiments of the present disclosure.
Figure 6B:
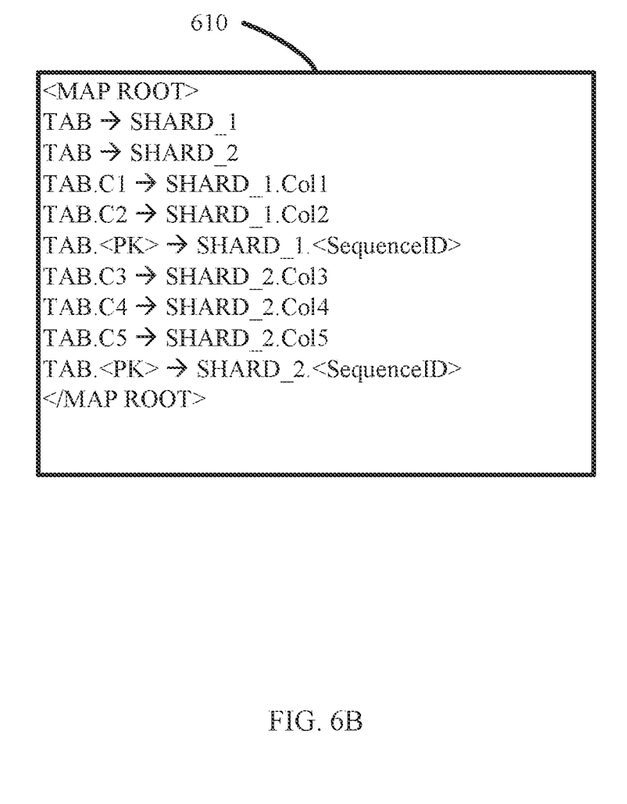
FIG. 6B includes an example configuration file for a shard operation, in accordance with some embodiments of the present disclosure.

Configuration file 434 can be a file that tracks all shard operations in database 430. In some embodiments, configuration file 434 can include mapping data. The mapping data can map which columns from a table have been split into which shard. In some embodiments, configuration file 434 can include row sequence data, such as a sequence identifier (sequenceID). The sequence ID can be an integer that is changed based on the number of operations. In some embodiments, the sequence ID can be any data used to link data in various shards that were previously connected through the table design (e.g., data on a common row). The sequence ID can be used to ensure data is entered in the proper row after additional changes to a shard has occurred. For example, consider a table that has a first column and a second column. A first query can add a new row to the first column, and a second query can add data to both columns. After the first row and the second row are split into two separate shards, the link between previous rows must be maintained. The sequence ID can be used to ensure data from the second query is still linked as if on the same row, even after the first query has added new rows to the first column. FIG. 6B has an example of a configuration file and is discussed in further detail below.

Data 435 can be any data structure configured to store and organize data. In some embodiments, data 435 can include one or more data structures. The data structures can include tables, indices (indexes), columns, and the like. The data structures can be the target of the queries.

In some embodiments, data 435 includes one or more tables. Each table can include one or more columns and rows. In some embodiments, any table within data 435 can be subject to a shard operation and split into two or more shards/tables.

In some embodiments, data 435 includes two or more shards (or sets of shards). A shard can be any data structure that includes a portion of a table that has been subject to a shard operation. In some embodiments, shards can be linked/grouped together. Each group of shards stems from a single table that was subject to a shard operation. In some embodiments, it is possible that a shard can be a subject of a subsequent shard operation, but for purposes of this application, "table" refers to the set of columns that were in a single table prior to a shard operation, and shards are the two to or more separate tables that resulted from the shard operation.

Figure 5:
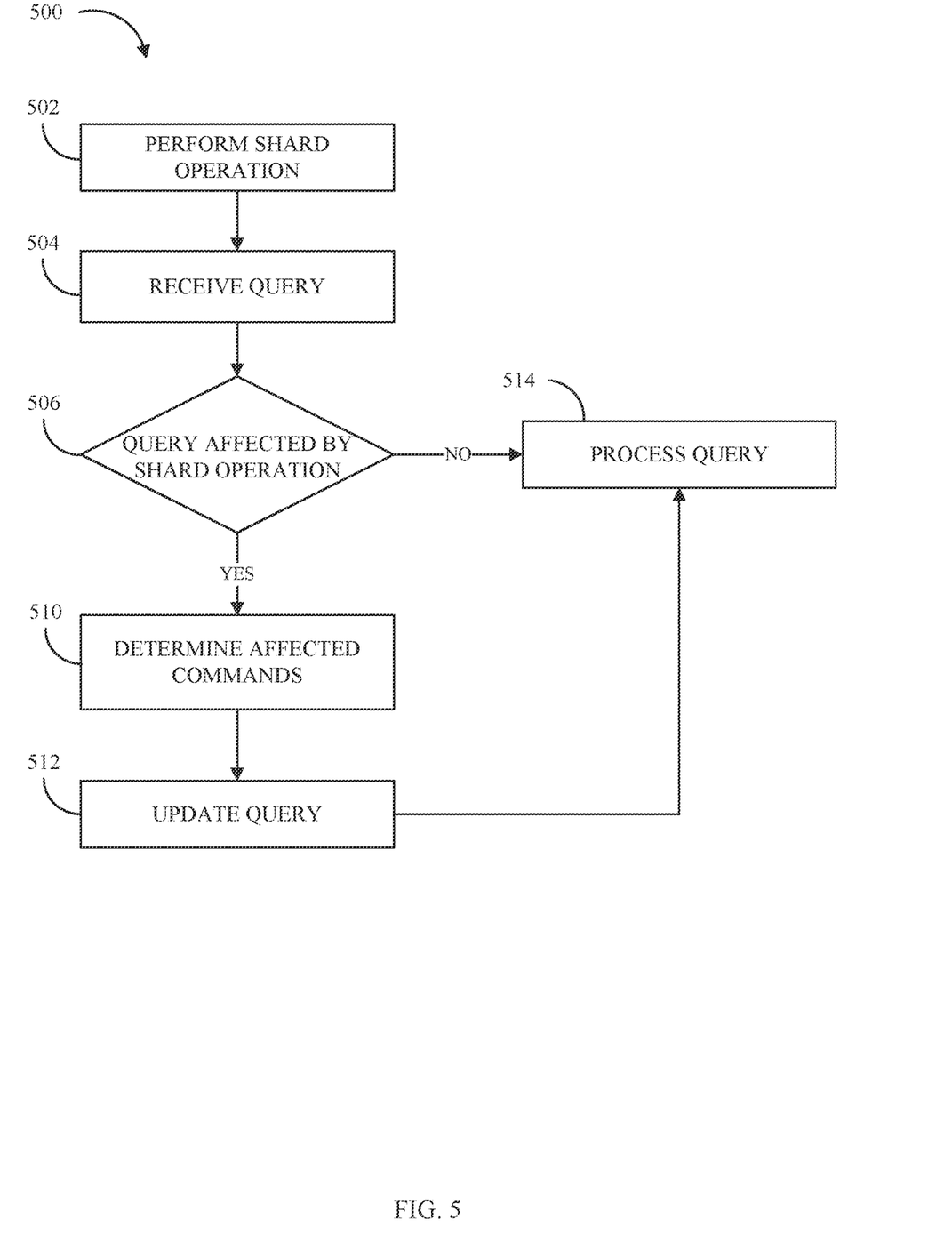
FIG. 5 illustrates a flow chart of an example method to mask shard operations, in accordance with some embodiments of the present disclosure.

FIG. 5 depicts a flowchart of an example method, method 500, for masking shard operations that can be performed in a computing environment (e.g., computing environment 400 and/or cloud computing environment 50). One or more of the advantages and improvements described above for masking shard operations may be realized by method 500, consistent with various embodiments of the present disclosure.

Method 500 can be implemented by one or more processors, host 405, database manager 410, application 412, database 430, query manager 431, SQL parser 432, shard manager 433, configuration file 434, data 435 and/or a different combination of hardware and/or software. In various embodiments, the various operations of method 500 are performed by one or more of host 405, database manager 410, application 412, database 430, query manager 431, SQL parser 432, shard manager 433, configuration file 434, and/or data 435. For illustrative purposes, the method 500 will be described as being performed by query manager 431.

At operation 502, query manager 431 performs a shard operation. In some embodiments, the shard operation can be performed by shard manager 433. The shard operation can be any database operation that that divides one table into two or separate tables or shards. The shard operation can be for any purpose. For example, a table may grow too big to be stored in a single location, so the shard operation can include storing the two or more shards in different storage locations. The shard operation can be to ensure regulatory compliance. FIG. 6A includes one example of a shard operation 600. Shard operation 600 divides table TAB into SHARD 1 and SHARD 2. Columns 1 and 2 are put into SHARD 1 and Columns 3, 4, and 5 into SHARD 2. SHARD 1 and SHARD 2 are names of the new tables and are illustrative.

In some embodiments, operation 502 includes generating/building a configuration file (e.g., configuration file 434). The configuration file can include a map of the shard operation. The configuration file can be formatted to update queries that are directed to the now sharded TAB. FIG. 6B includes one example of a configuration file 610 for shard operation 600. Configuration file 610 maps how each column call can be updated to call the similar column in SHARD 1 or SHARD 2. Configuration file 610 can include a SequenceID to maintain proper row relationships between the two new tables. In some embodiments, configuration file 610 can include the names of tables. Each table has a name, and each shard will have a different/new name from the original table. The configuration file 610 can provide a map between the new table names and column names/identifiers between the original table and the new shards.

At operation 504, query manager 431 receives a query. In some embodiments, the query is received from application 412, database manager 410, and/or host 405. In some embodiments, the query is received in Standard Query Language (SQL). In some embodiments, the query is configured to perform one or more commands on a set of data stored in database 430. In some embodiments, the query is configured to interact with the table subject to the shard operation (e.g., TAB). The query can include one or more of a select command, a delete command, an insert command, and an update command. In some embodiments, operation 504 includes generating a query access path. The query access path can represent the order of operations to properly execute the query. The query access path can be optimized by an optimizer. The optimizer can generate multiple paths to process the query and predict which of the multiple paths has the lowest cost.

At operation 506, query manager 431 determines if the query is affected by the shard operation. The shard operation can be the shard operation of operation 502. In some embodiments, determination is based on comparing the query terms to the configuration file. In some embodiments, the query is affected if there is any portion of the query configured to take any action in the table subject to the shard operation. The operation can be a select, delete, update, and/or insert, for one or more columns in the original table. In some embodiments, each query received is compared against all current configuration files.

If it is determined the query is affected by the shard operation (506:YES), then query manager 431 proceeds to operation 510. If it is determined the query is not affected by the shard operation (506:NO), then query manager 431 proceeds to operation 514.

At operation 510, query manager 431 identifies one or more commands in the query affected by the shard operation. In some embodiments, the affected commands are any commands in the query that reference the table subject to the shard operation (e.g., TAB). In some embodiments, the identification is based on the access path. In some embodiments, the identification is based on scanning the query. Any reference to any column/table affected by the shard operation can be identified and marked/recorded.

In some embodiments, identifying the one or more commands in the query affected by the shard operation includes identifying the shards where the data now resides. The identification can be based on analyzing the configuration file. Each reference to the affected table can be mapped, based on data in the configuration file, to the new shard and column within the shard.

At operation 512, query manager 431 updates the query. In some embodiments, updating the query includes updating the access path. In some embodiments, updating the query includes changing/transforming the query. The transformation can be based on the configuration file.

In some embodiments, an affected command includes a select command. If only one shard is affected, the new table/column name can be inserted in the place of the original table/column name. For example, TAB can be replaced by SHARD 1. If the query selects from two or more shards, the reference to each column from the original table is replaced by the new table name and column in the first shard and the new table name and column in the second shard. This can also include a sequence ID, so the selected data is as if it were in a common row of a single data.

Figure 6C:
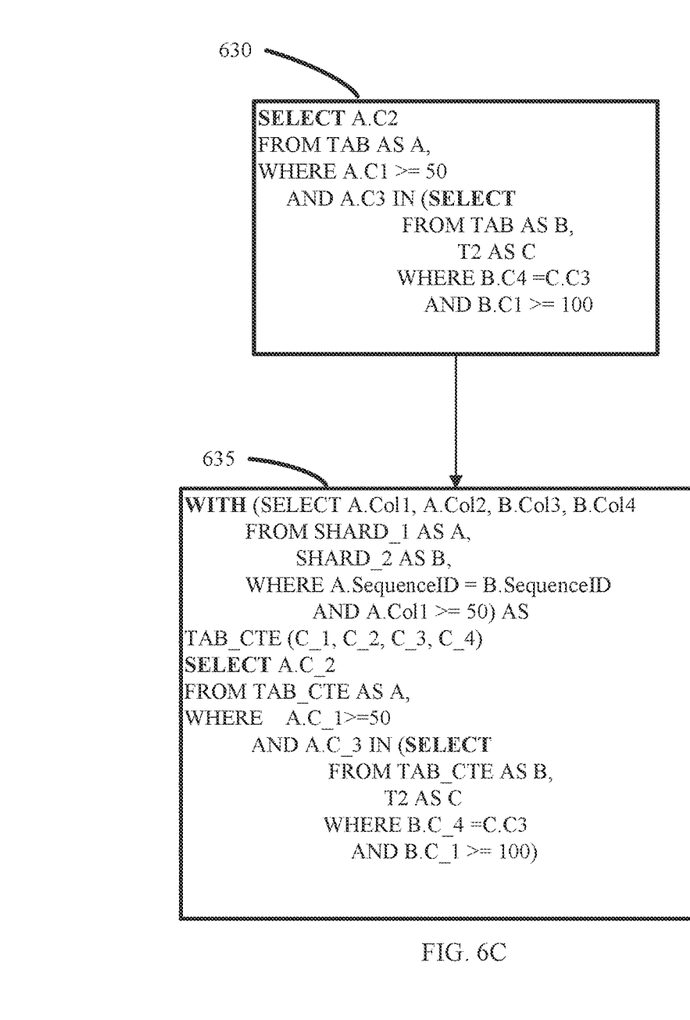
FIG. 6C include an example of masking/updating a select command after a shard operation, in accordance with some embodiments of the present disclosure.

In some embodiments, the query can reference at least one shard of two or more shards more than one time. In some embodiments, a common table expression (CTE) is generated/used to complete this operation. A CTE is a temporary data set that can be used within another command (e.g., select, insert, update, or delete). The select command update can include rewriting the original SQL with new base table join or CTE pattern for each column from each shard. FIG. 6C includes one embodiment of updating a select query dependent on two shards. FIG. 6C is based on the shard operation of FIGS. 6A and 6B. FIG. 6C includes original select query 630 and updated select query 635. Original select query 630 can be rewritten/updated to updated select query 635. Original select query 630 includes dependencies on at least one column in SHARD 1 and SHARD 2, in particular C.1, C.2, C.3, and C.4. The updated query generates a CTE with all values for Col1, Col2, Col3, and Col4 based on the predicate (e.g., A.C1>=50) in original select query 630. The remaining values are pulled from the CTE after updating the new column/table names for the old column names. Updated select query 635 can return the same set of results after a shard operation as an initial select query before the shard operation without a need to update the initial select query prior to the shard operation. The sequence ID is used to ensure the correct rows from each shard are brought into the CTE.

In some embodiments, one of the one or more commands includes a delete command. The delete command can refer to one or more shards. In some embodiments, the delete SQL statement is updated by a new base table join or select from old to consolidate multiple delete SQL into one SQL statement. Consider an example, where the delete command includes a single shard such as "delete row from TAB where C1<X", simply replacing TAB with the shard would not provide the same result as before the shard operation. The new command will include a delete from SHARD 2, where the sequence ID of any column in SHARD 2 is equal to SHARD 1 where column1 of SHARD 1 is less than X. Additionally, the order is important. The set of rows from both shards are identified and then deleted.

Figure 6D:
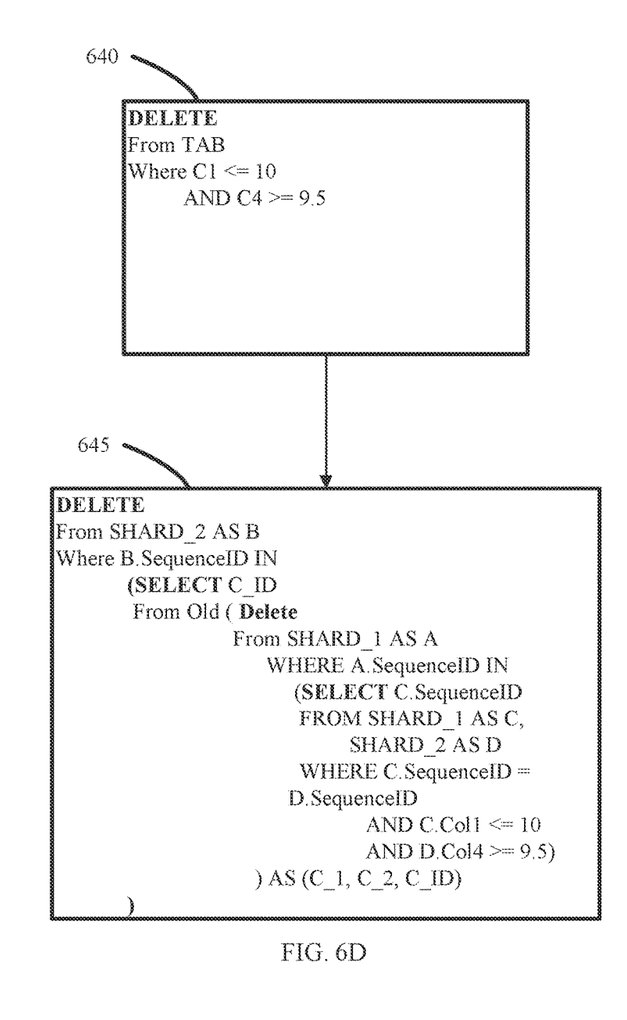
FIG. 6D include an example of masking/updating a delete command after a shard operation, in accordance with some embodiments of the present disclosure.

In some embodiments, the delete command is dependent on two or more shards. FIG. 6D includes one embodiment of updating this type of command in a query. FIG. 6D include original delete query 640 and updated delete query 645. Original delete query 640 can be rewritten/updated to updated delete query 645. FIG. 6D is based on the shard operation of FIGS. 6A and 6B. Original delete query is dependent on predicates for C1 and C4. Updated delete query 645 selects the relevant rows that meet the conditions from SHARD 1 and SHARD 2, using the sequence ID as a link between the shards. It then deletes the value linked to C_ID in Shard 1, then in SHARD 2, thereby providing the same result as initial delete query 640.

In some embodiments, one of the one or more commands includes an insert command. In some embodiments, the insert command refers to only one shard. In this case, the new table column name is used to replace the old name and a sequence ID is added. In some embodiments, an insert SQL statement is updated is rewritten with an 'insert include' clause and select from final pattern to consolidate the multiple inserts for multiple shards. The sequence ID will not have a matching ID in the other shards and the proper relationship can be maintained.

Figure 6E:
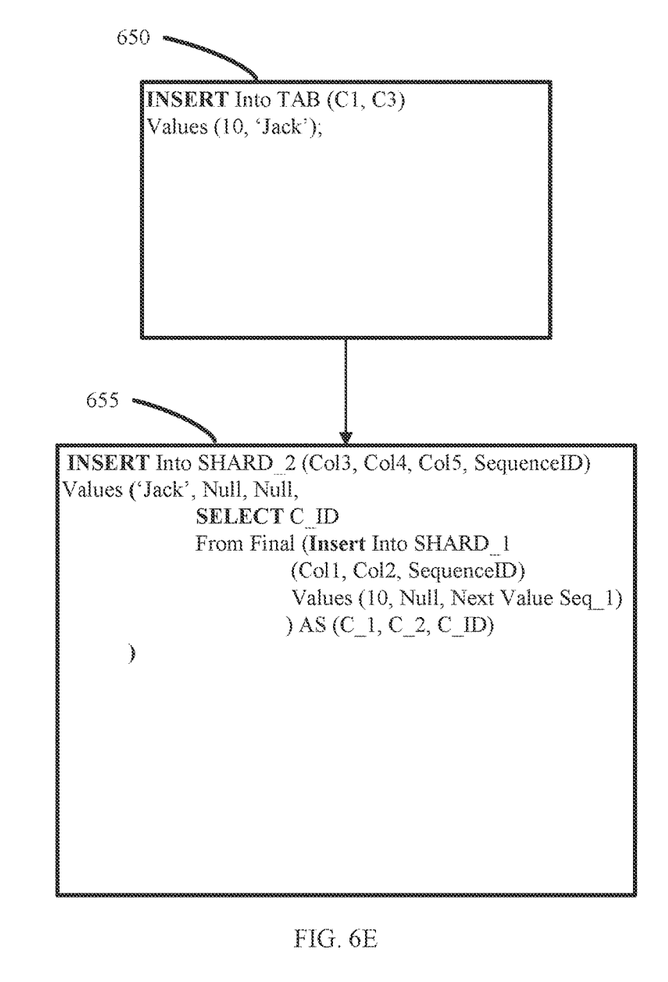
FIG. 6E include an example of masking/updating an insert command after a shard operation, in accordance with some embodiments of the present disclosure.

In some embodiments, the insert commands refer to two or more shards. FIG. 6E includes one embodiment of updating an insert command that includes columns to two or more shards. FIG. 6E is based on the shard operation of FIGS. 6A and 6B. FIG. 6E includes original insert query 650 and updated insert query 655. Original insert query 650 can be rewritten/updated to updated insert query 655. Initial insert query 650 includes insert values into C1 and C3. Updated insert query first inserts the relevant value into SHARD 1 with a sequence ID. The sequence ID is then used to insert the relevant data into SHARD 2 with the sequence ID that will keep the two values linked as if inserted into a common table. In some embodiments, additional predicates can be added to insert commands, the additional predicates can be added to the relevant portion of and/or configured to limit the number of entries inserted.

In some embodiments, one of the one or more commands includes an update command. In various embodiments, the update can be based on predicates for one or more shards and/or the update can update columns in one or more shards. In some embodiments, an update SQL is rewritten with an in a subquery, new base table join, and select from file pattern to consolidate the needed multiple input commands for each affected column in the various shards. For example, consider a query that updates one column in one shard, such as, "update TAB, Set C2="NAME" where C1<=X." The updated query can replace the name of the shard, TAB to SHARD 1, the predicate column C1 to Col_1 and the column to be updated C2 to Col_2.

Figure 6F:
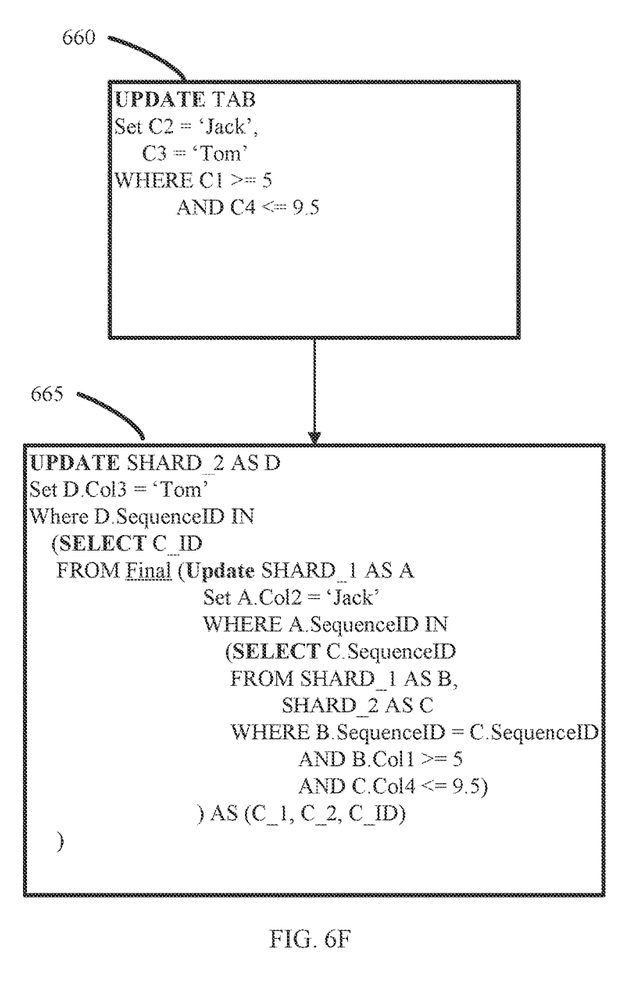
FIG. 6F include an example of masking/updating an update command after a shard operation, in accordance with some embodiments of the present disclosure.

FIG. 6F includes an example of a query transformation for an update query that includes a predicate for two shards and an update in two shards. FIG. 6F is based on the shard operation of FIGS. 6A and 6B. FIG. 6F include original update query 660 and updated update query 665. Original update query 660 can be rewritten/updated to updated update query 665. Original update query 660 will update a column in SHARD_1 and SHARD_2 based on a predicate from SHARD 1 and SHARD 2. First, the relevant rows from each shard are selected based on the two predicates and linked with a sequence ID. Col_2 is updated to "Jack". The next shard, Col_3 is then updated to "TOM" based on the common sequence ID from the CTE and the updated Col_2.

In various embodiments, any number of commands can be joined together, and the method for each type of command used to update complex queries. For example, a single query can have a select, an update, and an insert, and the general process employed in FIGS. 6C, 6E, and 6F can be used for each portion of the query. In various embodiments, the number of shards that are connected to both predicates and/or the commands can be higher or lower than the example of FIGS. 6C, 6D, 6E, and 6F. For example, each of the examples include only two shards, but the general process can be expanded to include additional shards. The additional shards can have predicates columns for the actions and/or be the target of the various actions.

At operation 514, query manager 431 executes the query. The executed query can be the updated query. The query can be executed based on the query access path. This method allows for shard operations to be performed without the need to update the queries that access the table concurrently. This can greatly reduce the cost needed to perform shard operations and can allow for greater flexibility in shard operations to optimize the structure within a database. As new queries are generated and/or as software is updated the new table structure can be incorporated into the new queries. In some embodiments, operation 514 includes returning the query to the source. Returning can include sending a data set and/or a confirmation that the actions of the query were completed.

Computer Technology and Computer Readable Media.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
performing a vertical shard operation on a first table with a first column and a second column, wherein the shard operation divides the first table into a first shard with the first column and a second shard with the second column;
receiving a query, wherein the query is configured to perform at least a first command;
determining the first command is directed to the first column on the first table;
updating the query to access the first shard in place of the first table, wherein the updating includes rewriting the first command;
executing the query; and
returning a set of results for the query to a source of the query.

2. The method of claim 1, wherein the set of results for the query is the same as if the query is executed on the first table prior to performing the shard operation.

3. The method of claim 1, wherein the updating the query is based on a configuration file.

4. The method of claim 3, further comprising:
mapping, using the configuration file, the first column from the first table to the first shard and the second column to the second shard.

5. The method of claim 4, wherein the updating includes replacing a table name in the query with a first shard name, wherein the table name and the first shard name are included in the configuration file.

6. The method of claim 5, wherein the first command includes a first predicate based on the second column in the second shard.

7. The method of claim 6, wherein the first predicate of the second shard is aligned with the first command targeting the first shard by a sequence identifier.

8. The method of claim 5, wherein the query includes a second command directed to the second shard.

9. The method of claim 1, wherein:
the first command is a select command; and
the updating the query includes rewriting the first command using a common table expression pattern.

10. The method of claim 1, wherein:
the first command is a delete command; and
the updating the query includes rewriting the first command with new base table join pattern to consolidate multiple deletes into one statement.

11. The method of claim 1, wherein:
the first command is an insert command; and
the updating the query includes rewriting the first command with an 'insert include' clause and select from final pattern to consolidate multiple inserts into one statement.

12. The method of claim 1, wherein:
the first command is an update command; and
the updating the query includes rewriting first command select from final pattern to update multiple updates into one statement.

13. A system comprising:
a processor; and
a computer-readable storage medium communicatively coupled to the processor and storing program instructions which, when executed by the processor, are configured to cause the processor to:
perform a vertical shard operation on a first table with a first column and a second column, wherein the shard operation divides the first table into a first shard with the first column and a second shard with the second column;
receive a query, wherein the query is configured to perform at least a first command;
determine the first command is directed to the first column on the first table;
update the query to access the first shard in place of the first table, wherein the updating includes rewriting the first command;
execute the query; and
return a set of results for the query to a source of the query.

14. The system of claim 13, wherein the updating the query is based on a configuration file.

15. The system of claim 14, wherein the configuration file is used to map the first column from the first table to the first shard and the second column to the second shard.

16. The system of claim 15, wherein the updating includes replacing a table name in the query with a first shard name, wherein the table name and the first shard name are included in the configuration file.

17. A computer program product, the computer program product comprising a computer readable storage medium having program instructions embodied therewith, the program instructions executable by a processing unit to cause the processing unit to:
perform a shard vertical operation on a first table with a first column and a second column, wherein the shard operation divides the first table into a first shard with the first column and a second shard with the second column;
receive a query, wherein the query is configured to perform at least a first command;
determine the first command is directed to the first column on the first table;
update the query to access the first shard in place of the first table, wherein the updating includes rewriting the first command;
execute the query; and
return a set of results for the query to a source of the query.

18. The computer program product of claim 17, wherein the updating the query is based on a configuration file.

19. The computer program product of claim 18, wherein the configuration file is used to map the first column from the first table to the first shard and the second column to the second shard.

20. The computer program product of claim 19, wherein the updating includes replacing a table name in the query with a first shard name, wherein the table name and the first shard name are included in the configuration file.

* * * * *